(12) United States Patent
Malins

(10) Patent No.: US 10,411,367 B2
(45) Date of Patent: Sep. 10, 2019

(54) SECURING DEVICE

(71) Applicant: Gallagher Group Limited, Hamilton (NZ)

(72) Inventor: Craig David Malins, Hamilton (NZ)

(73) Assignee: Gallagher Group Limited, Hamilton (NZ)

( * ) Notice: Subject to any disclaimer, the term of this patent is extended or adjusted under 35 U.S.C. 154(b) by 0 days.

(21) Appl. No.: 15/863,447

(22) Filed: Jan. 5, 2018

(65) Prior Publication Data
US 2018/0131105 A1 May 10, 2018

Related U.S. Application Data

(63) Continuation of application No. 14/773,259, filed as application No. PCT/NZ2014/000027 on Sep. 4, 2015, now Pat. No. 9,893,437.

(51) Int. Cl.
| | |
|---|---|
| *H01R 4/38* | (2006.01) |
| *H01R 4/48* | (2006.01) |
| *H01R 4/36* | (2006.01) |
| *H02G 7/05* | (2006.01) |
| *H01R 43/16* | (2006.01) |
| *H01R 13/58* | (2006.01) |

(52) U.S. Cl.
CPC .............. *H01R 4/48* (2013.01); *H01R 4/36* (2013.01); *H01R 43/16* (2013.01); *H02G 7/056* (2013.01); *H01R 13/5833* (2013.01)

(58) Field of Classification Search
CPC .......... H01R 4/38; H01R 4/48; H01R 11/283; H01R 11/282; H01R 11/285; H01R 11/287
USPC .................. 174/480, 660; 439/815, 816, 810
See application file for complete search history.

(56) References Cited

U.S. PATENT DOCUMENTS

| | | | | |
|---|---|---|---|---|
| 3,533,650 A | * | 10/1970 | Smith ..................... | F16L 41/06 285/197 |
| 3,860,351 A | * | 1/1975 | Weiss ..................... | F16B 2/065 403/175 |
| 4,784,621 A | * | 11/1988 | Auclair ................... | H01R 4/64 439/793 |
| 4,875,876 A | * | 10/1989 | O'Loughlin ............. | H01R 4/38 439/431 |
| D314,745 S | | 2/1991 | Southoff | |

(Continued)

FOREIGN PATENT DOCUMENTS

| | | |
|---|---|---|
| BE | 427209 | 4/1938 |
| DE | 623406 | 12/1935 |

(Continued)

OTHER PUBLICATIONS https://am.gallagher.com/nz/products/electric-fencing/fencing/permanent-fencing/clamps-and-joiners; retrieved from the website on Sep. 4, 2015; 2 pages.

(Continued)

*Primary Examiner* — Abdullah A Riyami
*Assistant Examiner* — Thang H Nguyen
(74) *Attorney, Agent, or Firm* — Moore & Van Allen PLLC; Henry B. Ward, III

(57) ABSTRACT

A wire clamp is provided, having a body through which an aperture extends. An opening extending along a side of the body intersects with the aperture along its length. The wire clamp also includes a securing device configured to extend into the aperture.

14 Claims, 4 Drawing Sheets

(56) References Cited

U.S. PATENT DOCUMENTS

| | | | |
|---|---|---|---|
| 5,556,299 A * | 9/1996 | Finke | H01R 11/15 439/479 |
| D426,459 S | 6/2000 | Van den Branden et al. | |
| D484,400 S | 12/2003 | Blake et al. | |
| D507,481 S | 7/2005 | Blake et al. | |
| D522,348 S | 6/2006 | Hansen | |
| D523,738 S * | 6/2006 | Henson | D8/395 |
| D591,587 S | 5/2009 | Mason | |
| D620,346 S | 7/2010 | Gretz | |
| D620,786 S | 8/2010 | Gretz | |
| D622,583 S | 8/2010 | Parks et al. | |
| D640,537 S | 6/2011 | Parks et al. | |
| D670,750 S | 11/2012 | Chien | |
| D712,243 S | 9/2014 | Raines | |
| 2008/0083555 A1 * | 4/2008 | Kim | H01B 17/16 174/138 F |
| 2010/0320185 A1 * | 12/2010 | Springer | H05B 3/56 219/201 |
| 2011/0290550 A1 * | 12/2011 | Kiely | H02G 3/0691 174/480 |
| 2012/0077391 A1 * | 3/2012 | He | H01R 4/4818 439/816 |
| 2012/0142231 A1 * | 6/2012 | De France | H01R 4/38 439/815 |
| 2013/0072072 A1 * | 3/2013 | Fehling | H01R 4/4818 439/816 |
| 2014/0110230 A1 * | 4/2014 | Eberts | H01H 71/08 200/237 |

FOREIGN PATENT DOCUMENTS

| | | |
|---|---|---|
| DE | 3205608 A1 | 8/1983 |
| GB | 132700 A | 1/1919 |
| GB | 1525843 A | 9/1978 |

OTHER PUBLICATIONS http://www.stafix.com/en-us/category/joing-clamps; retrieved from the website on Sep. 4, 2015; 2 pages.

International Search Report for PCT/NZ2014/000027, dated May 30, 2014.

* cited by examiner

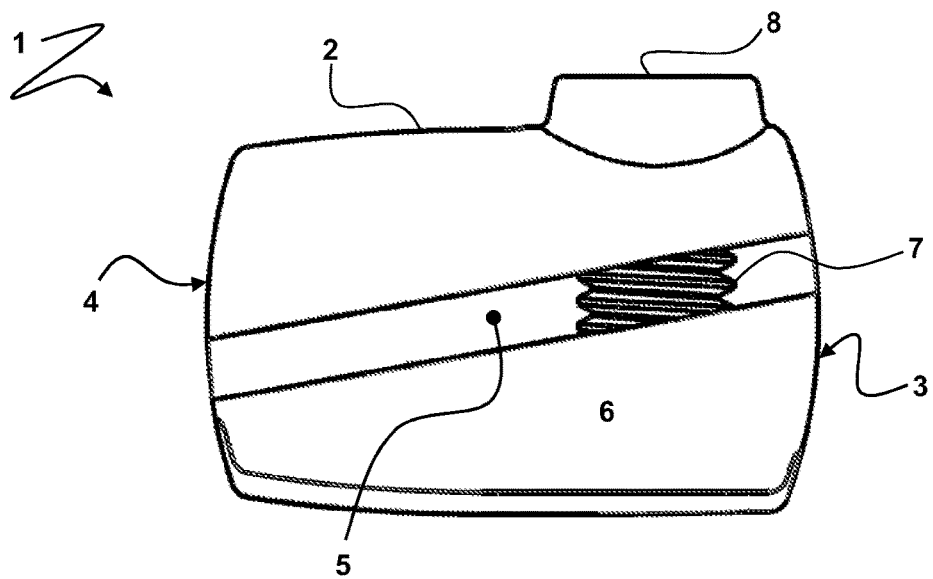
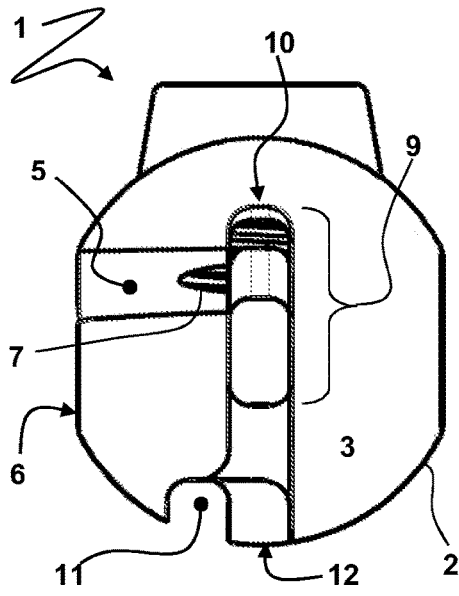
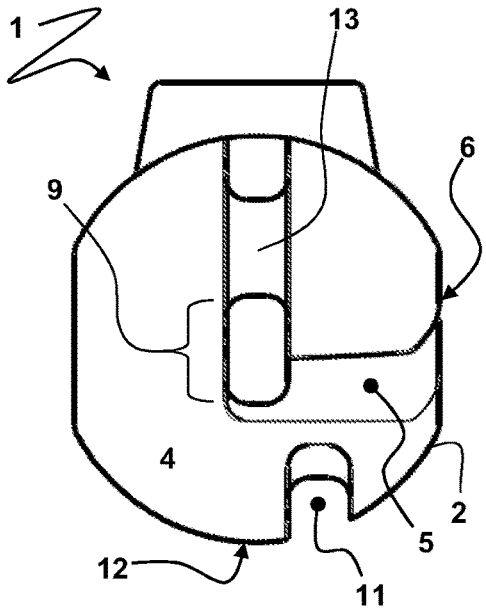

SECURING DEVICE

CROSS-REFERENCE TO RELATED APPLICATIONS

This application is a continuation of co-pending U.S. patent application Ser. No. 14/773,259, filed Sep. 4, 2015, and titled "SECURING DEVICE FOR ELECTRICALLY CONNECTING AT LEAST TWO WIRES," which application is a national stage entry of International Application No. PCT/NZ2014/000027, titled "SECURING DEVICE", pursuant to 35 U.S.C. § 371, which international application claimed priority to New Zealand Patent Application Number 607726, filed Mar. 6, 2013, and titled "SECURING DEVICE", the entire contents of each of which are incorporated herein by reference.

TECHNICAL FIELD

This invention relates to a securing device for electrically connecting at least two wires. In particular, the present invention relates to a wire clamp.

The invention may have particular application to the electric fencing industry, and this will now be referenced throughout this specification.

BACKGROUND ART

The use of electric fencing is common for a number of industries, where a current is applied to a fence line to provide an electric shock to any objects that come in contact with it. The application is especially useful for the use of controlling movement of livestock.

Typically, electric fencing is set up by having a plurality of posts along a fence line with fencing wire connecting the posts. This fencing wire is secured to the posts using brackets and tensioners to keep the fence taut. The fencing wire is also conductively connected to energisers which provide the electrical current passing through the wire.

Such fences may extend in networks in the order of kilometers in length—requiring a substantial amount of labour (and therefore cost) to install and maintain. As a result, there are a wide range of products, such as connectors and brackets, available to allow the user to securely, safely, and quickly attach fencing wire and other accessories (such as energisers) to posts, fencing standards or any other object to which the fencing wire is to be secured.

In particular, it is often necessary to connect one end of a wire to another wire—for example to either repair or extend the fence, or to terminate the wire with a connector designed to secure the fencing wire to a post.

Wire clamps are widely known for this purpose. In particular, a commonly used configuration places two washers between a bolt head and a nut. Wires are positioned between the washers, and the nut tightened to hold the wires in place. The washers provide electrical conductivity between the wires.

However, such wire clamps have a number of disadvantages. In particular, it can be tedious and time consuming to secure the wires due to the need to hold the wires in place relative to the clamp while the nut is tightened.

Further, electrical contact between the wires in known clamps is reliant on an intermediate part. Electric fence components are exposed to all weather conditions, and the clamp may form an oxidizing layer which affects conductivity.

The power efficiency and effectiveness of the fence is dependent on its conductivity, and it is generally desirable to reduce the possibility of this being affected by any wire clamps.

Given the simplicity of electric fencing technology and related equipment, any improvements which lead to operational advantages such as reduction in the time and effort required to establish a robust fencing line are considered to be particularly advantageous.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to one aspect of the present invention there is provided a wire clamp, including:
  a body having a first end and a second end;
  an aperture in the body extending between the first end and the second end;
  an opening extending along a side of the body between the first end and the second end, wherein the opening intersects with the aperture along its length; and
  a securing device configured to extend into the aperture.

According to another aspect of the present invention there is provided a method of connecting a first wire and a second wire to each other using a wire clamp substantially as described above, including the steps of:
  positioning the first wire in the aperture such that a length of the first wire extends between the first end and the second end;
  passing the second wire through the opening into the aperture such that a length of the second wire extends between the first end and the second end; and
  extending the securing device into the aperture to bear against at least one of the wires such that the first wire and second wire are clamped together between the securing device and an inner surface of the aperture.

Reference will herein be made to various points on the body—for example ends, sides, top, and base. It should be appreciated that reference to these points is made for the purpose of illustrating the relative positioning of various features of the present invention, and is not intended to place limitations on the shape or orientation of the body unless expressly stated.

For illustrative purposes the body may be envisaged as being generally cuboid in shape. It should be appreciated that this is not intended to be limiting, as the body may, for example, have curved faces and/or curved transitions between the faces—or indeed be non-cuboid in shape.

It is envisaged that the body may be elongate along the dimension between the first and second ends. In doing so, a target length of the first and second wires to be in contact with each other may be achieved while streamlining the body—decreasing the amount of material required for manufacture, and reducing the visible profile of the wire clamp.

Reference to the aperture extending between the first and second ends of the body should be understood to mean a passage running through the body, having an opening at each end.

The opening allows access to the aperture from the side of the body, for reasons which will be discussed below. The opening may be elongate between the ends of the body—creating a slot in the side of the body.

In an embodiment the width of the aperture may be less than twice the diameter of wire to be secured by the wire clamp. This may help ensure that the wires are in direct contact with each other when clamped between the securing device and an inner surface of the aperture. The direct contact may assist in improving the conductivity of the connection between the wires rather than relying on an intermediary part.

Similarly, in embodiments the height of the elongate opening may be less than twice the diameter of wire to be secured by the wire clamp. In doing so, only one wire at a time may pass through the opening—assisting in retaining the wires within the aperture prior to securing them using the securing device.

In an embodiment the body may include an attachment portion at an end of the body, the attachment point configured to interact with a connector at the end of a wire to be secured by the wire clamp. The attachment point may be a raised lip adjacent to the aperture at the end, and the connector a clip—for example an R-clip (also known as a hairpin cotter)—which may be drawn over the raised lip to locate the end of the wire relative to the wire clamp.

The interaction between the attachment portion and the connector at the end of the wire may permit pivotal rotation of the wire at the end with the attachment point (within the bounds of the aperture). It is envisaged that this may be particularly useful in an embodiment of the wire clamp as discussed below.

In an embodiment the opening may intersect with the aperture below an uppermost point of the aperture at one or both ends of the body. This may create a recess above the opening in which a wire may be located, allowing a second wire to be passed through the opening into the aperture.

For example, in use a first wire engaged with the attachment portion may be rotated to be located against the top of the aperture in the recess, unblocking the opening into the aperture. A second wire may then be passed through the opening and down into the lower portion of the aperture. Rotating the first wire downwardly blocks the opening and prevents the second wire from escaping through the opening. The securing device may be extended into the aperture against the first wire, forcing the first wire against the second wire, which is in turn forced against the lower surface of the aperture—securing the wires relative to each other.

In an embodiment a height of the aperture may be greater at one of the ends than the other. In particular, the height of the aperture may be greater at the end opposite that at which the attachment point is located. It is envisaged that by doing so, the wire connected to the attachment point may pivot upwardly into the recess, and when it is desired to secure the wires together, rotate downwardly into a position such that the wire is substantially parallel with the lower surface of the aperture. This may cause a greater length of the wires to be in contact with each other along the length of the aperture, improving conductivity.

It is envisaged that in the majority of cases, the material type of wires being clamped against each other will be the same. The resulting gas tight joint between the wires significantly reduces the likelihood of corrosion at the only mechanical link between them, as any electrolytic reaction will not be at the conduction point between the wires.

This may be particularly important in security installations where there may be in the order of five thousand wire connections to be made. Reducing the incidents of mechanical (and thus electrical) failure can have a significant impact on the reliability of the installation and reducing the amount of maintenance required.

Further, as the electrical connection is formed as the result of the wires clamping against each other, the wire clamp, or parts thereof, may be made of a non-conductive material. For example, at least a portion of the wire clamp may be made of a plastics material such as glass filled nylon which may be more easily molded at a lower cost than a metal equivalent. It should be appreciated that this is not intended to be limiting, and that the wire clamp may be made of a conductive material.

In an embodiment the opening may extend at an angle between the first and second ends of the body. The opening at one end may be located higher on the side of the body than at the other end. In particular, the opening at the end having the attachment point may be lower on the side of the body than at the other end. In doing so, it is envisaged that lateral movement of a wire within the aperture may be prevented by a wall created between the lowermost point of the aperture and the opening. This may assist in keeping the wire(s) in place while the securing device is actuated.

It follows that in such an embodiment the height of the opening may be less than the height of the aperture, in order for the wall to be created.

In an embodiment the wire clamp may include a groove along the base of the body. In particular the grove may extend between the first end and the second end. The groove may act as a guide for a wire extending through the aperture between the ends, and looped underneath the body back towards the end at which it entered the aperture where it may be tied off around itself.

The groove at the end at which the wire enters the aperture may be laterally offset from the aperture at that end. In particular, the groove at the other end may be aligned with the aperture at the other end, and includes an angled transition between the ends. In doing so, the end of the wire at the exit from the groove is oriented to run past itself—making it easier to maintain tension while tying the wire off around itself.

Reference to a securing device should be understood to be any means or mechanism known to a person skilled in the art for bearing against an object to clamp it against a bearing surface.

In an embodiment the securing device may include an internally threaded passage intersecting with the aperture, and a fastener having an external thread configured to engage with the passage. The fastener may be a grub screw, enabling a flush finish with the body when in an engaged position.

It should be appreciated that other forms of securing mechanisms are envisaged—for example a ratcheted lever.

In an embodiment one of the wires used with the wire clamp may include a tensioning element. The tensioning element may be, for example, a coil tension spring formed from the wire itself, but in some embodiments may be a distinct part to the wire.

The tensioning element may assist in connecting the wire to a fence post, energizer, or another wire by providing a degree of give in the wire. In order to facilitate this connection the distal end of the wire may be terminated with a fastener, such as a hook. As well as achieving the desired tension of the installed fence, this may allow the joined wires to be extended to reach the desired connection point without placing excessive strain on the wires and/or overcoming the clamping effect of the wire clamp.

BRIEF DESCRIPTION OF THE DRAWINGS

Further aspects of the present invention will become apparent from the ensuing description which is given by way of example only and with reference to the accompanying drawings in which:

FIG. 1A is a side view of an exemplary wire clamp according to one aspect of the present invention;

FIG. 1B is a first end view of the exemplary wire clamp;

FIG. 1C is a second end view of the exemplary wire clamp;

DETAILED DESCRIPTION

Figure 1D:
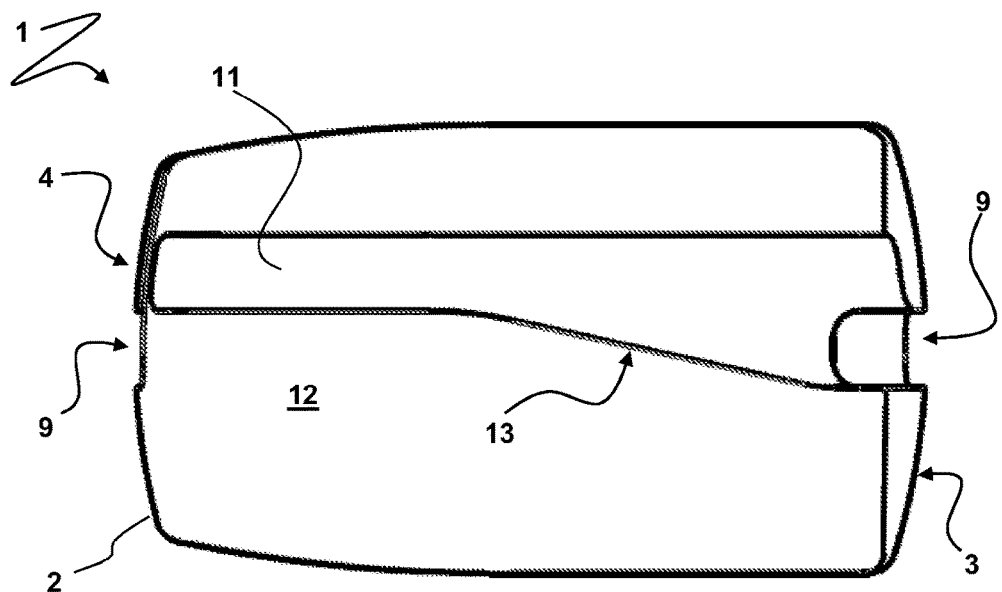
FIG. 1D is a bottom up view of the exemplary wire clamp.

FIG. 1A illustrates a wire clamp (generally indicated by arrow 1) including a body 2 having a first end 3 and a second end 4. An elongate opening in the form of a slot 5 extends from the side 6 of the body 2 into its centre. The slot 5 extends at an angle between the first end 3 and second end 4 such that it is higher on the side 6 of the body at the first end 3 than at the second end 4.

An internally threaded bore 7 extends downwardly from a top 8 of the body 2.

The height of the slot 5 in terms of the size of the gap is less than twice the diameter of wire to be secured by the wire clamp 1. This means that only one wire at a time may pass through the slot, as will be described below with reference to FIG. 3.

FIG. 1B shows the wire clamp 1 from the first end 3. The body 2 includes an aperture 9 extending from the first end 3 to the second end 4 (which will be described below with reference to FIG. 1C). The threaded bore 7 intersects with the aperture 9, allowing a securing device in the form of a threaded fastener such as a grub screw (not illustrated) to be extended into the aperture 9 for reasons which will be discussed further below. The width of the aperture 9 is less than twice the diameter of wire to be secured by the wire clamp 1, the motivation for which will be described below with reference to FIG. 3.

The slot 5 intersects with the aperture 9 along their respective lengths between the first end 3 and second end 4. The slot 5 intersects with the aperture 9 below an uppermost point of the aperture 9 by substantially the diameter of a wire to be secured using the clamp 1. This forms a recess 10 above the slot 5 in which a wire may be positioned in order to allow a second wire to be moved sideways through the slot 5 and down into the lower portion of the aperture 9.

A groove 11 extends along a base 12 of the body 2 between the first end 3 and second end 4. As seen in FIG. 1C, which shows the second end 4, the position of the groove 11 at the second end 4 is laterally offset from the aperture 9 at the second end 4. By doing so a wire entering the aperture 9 at the second end 4 may be wrapped around the base 12 following the groove 11 and be guided to exit the groove 11 at the second end 4 to the side of its point of entry, making for a more natural action when tying the wire off around itself.

This is further illustrated by FIG. 1D showing the base 12 of the body 2. The groove 11 includes an angled transition 13 between the first end 3 and second end 4, which guides the wire from its exit from the aperture 9 back around to be beside its entry.

Figure 1E:
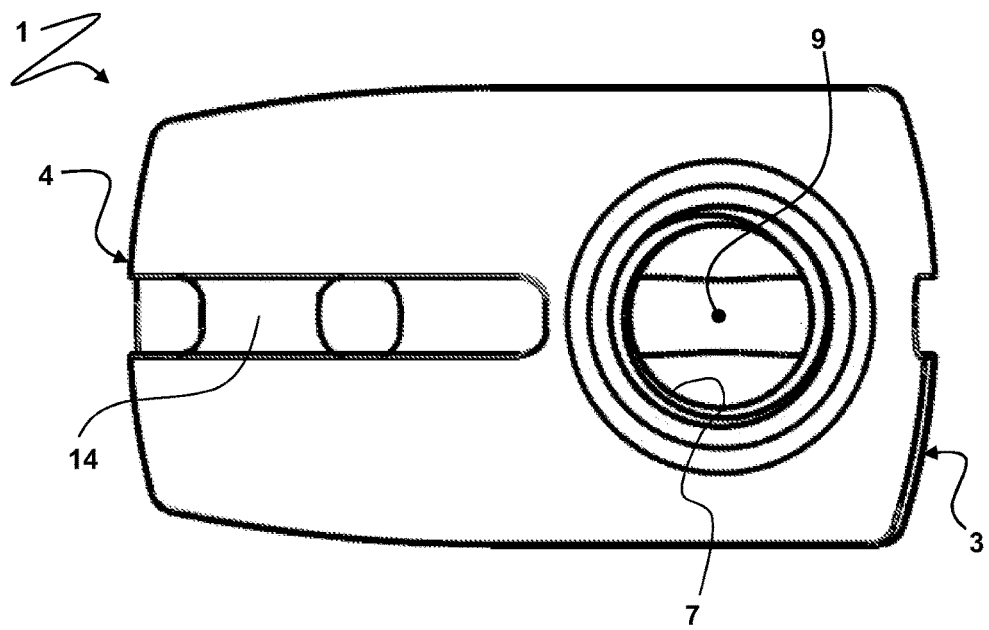
FIG. 1E is a top down view of the exemplary wire clamp.

FIG. 1E shows a top down view of the wire clamp 1. An attachment point in the form of a raised lip 14 is positioned adjacent to the aperture 9 at the second end 4, use of which will now be described with reference to FIG. 2A and FIG. 2B.

Figure 2A:
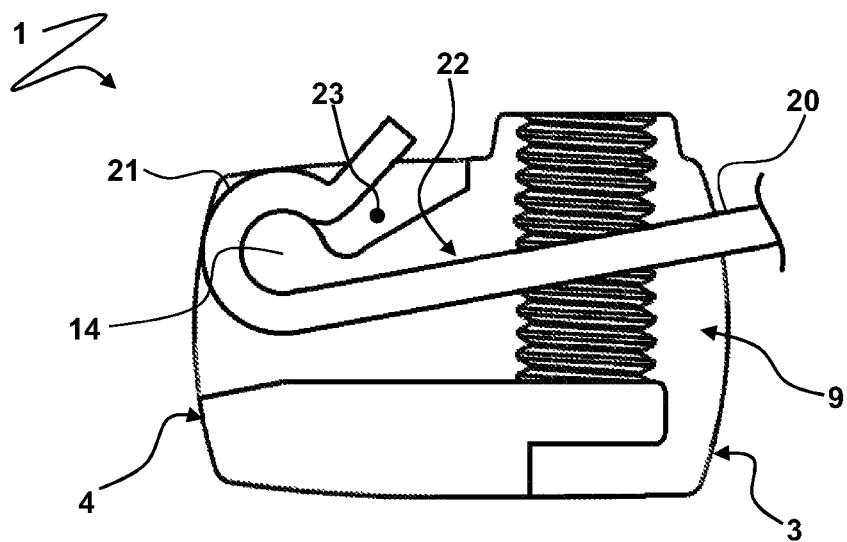
FIG. 2A is a longitudinal side cross sectional view of an exemplary wire clamp according to another aspect of the present invention.
Figure 2B:
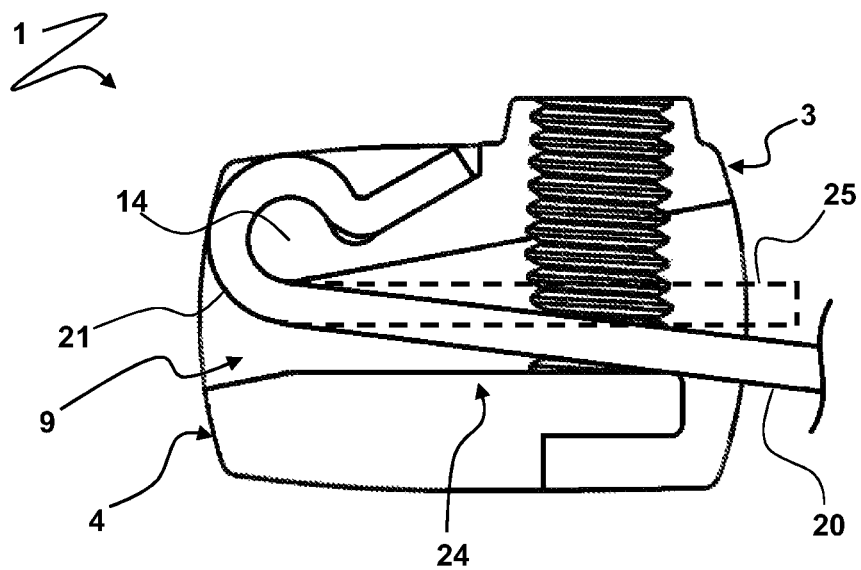
FIG. 2B is a longitudinal side cross sectional view of another arrangement of the exemplary wire clamp.

FIG. 2A and FIG. 2B are longitudinal horizontal cross sectional views of the wire clamp 1. A first wire 20 including an R clip 21 is illustrated. The wire 20 has been inserted sideways through the slot 5 (not shown in FIG. 2A or FIG. 2B, but as illustrated in FIG. 1A) into the aperture 9, and pulled towards the first end 3 until the R clip 21 has slid over the raised lip 14 and clipped into position. This retains the first wire 20 within the wire clamp 1, freeing up both hands of the user to complete the wire clamping operation.

As illustrated in FIG. 2A, the wire 20 may be rotated about the lip 14 to press against the top surface 22 of the aperture 9. In this position the wire 20 is located within the recess 10 above the slot 5 as seen in FIG. 1B, clearing the slot 5 for a second wire (not illustrated) to be inserted sideways through the slot 5 into the aperture 9.

Area 23 adjacent to the lip 14 provides clearance for the R clip 21 as the wire 20 is moved between the position illustrated in FIG. 2A to that shown in FIG. 2B, pressing against the bottom surface 24 of the aperture 9.

The height of the aperture 9 at the second end 4 is such that the gap between the lip 14 and the bottom surface 24 of the aperture 9 is substantially twice the diameter of the wire 20 to be secured. This means that when a wire (not illustrated) is positioned along the bottom surface 24 of the aperture 9, rotation of the wire 20 to be in contact with the bottom wire results in the horizontal position illustrated by dashed lines 25. This position causes a length of the wires to be in contact with each other along the length of the aperture, rather than an air gap being created prior to the point that the grub screw (not illustrated) creates a clamping effect.

Figure 3:
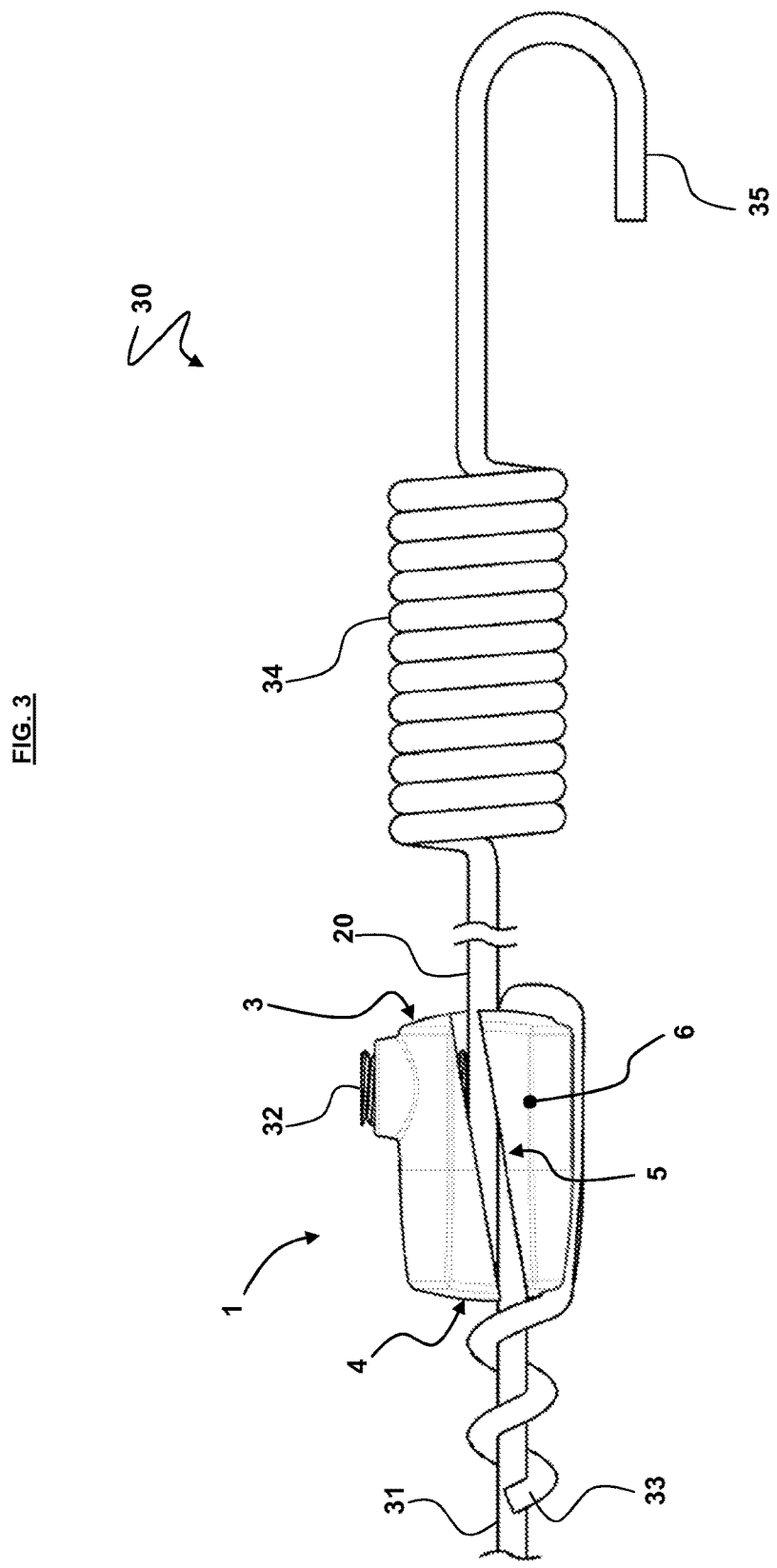
FIG. 3 is a side view of an exemplary wire clamp arrangement according to a further aspect of the present invention.

FIG. 3 illustrates a connected fence line 30, using the wire clamp 1 to connect the first wire 20 to a second wire 31. Reference to previous figures will be made in the course of describing assembly of the fence line 30.

The first wire 20 is passed sideways through the slot 5 and pulled towards the first end 3 to engage the R clip 21 with the raised lip 14—as illustrated in FIG. 2A and FIG. 2B.

The first wire 20 is lifted upwards at the first end 3 to be located in recess 10 as illustrated in FIG. 2A. The second wire 31 is inserted sideways through the slot 5, and guided into the lower portion of the aperture 9. The wall between the aperture 9 and side 6 prevents lateral movement of the second wire 31, and the first wire 20 is permitted to drop into the lower portion of the aperture 9 to prevent the second wire 31 from exiting back through the slot 5.

The width of the aperture 9 is narrow enough such that when grub screw 32 is tightened to bear against the first wire 20, it is the first wire 20 itself which then forces the second wire 31 against the bottom surface 24 of the aperture 9—clamping the wires 20, 31 in place.

The end 33 of the second wire 31 may be wrapped around the first end 3 of the wire clamp 1 into the groove 11 (refer to FIG. 1B), and guided to exit the groove 11 at the second end 4 below and to the side of the second wire 31 where it enters the aperture 9. The end 33 may then be wrapped around the second wire 31 to tie it off.

The first wire 20 includes a tensioning element in the form of a coil tension spring 34 terminated with a hook 35. The spring may be expanded to connect the hook 35 onto a source of electrical pulses—whether an energizer, or an energized fence wire or connection point.

Aspects of the present invention have been described by way of example only and it should be appreciated that modifications and additions may be made thereto without departing from the scope thereof as defined in the appended claims.

I claim:

1. A wire clamp, comprising:
   a body having a first end and a second end;
   an aperture extending through the body from the first end to the second end for receiving a first wire therein;
   an elongate opening extending from the first end to the second end along a side of the body for receiving a second wire therein, and intersecting with the aperture along an entire length of the aperture;
   a groove along an entire length of a base of the body between from the first end and to the second end for receiving the second wire therein; and
   a securing device configured to extend into the aperture to clamp onto the first wire within the aperture, wherein the first wire then forces the second wire against a bottom surface of the aperture.

2. The wire clamp as claimed in claim 1, wherein the body comprises an attachment portion at one of the ends of the body, the attachment portion configured to mechanically interact with a connector at an end of a wire to be secured by the wire clamp.

3. The wire clamp as claimed in claim 2, wherein the attachment portion is a raised lip adjacent to the aperture, and the connector is a clip.

4. The wire clamp as claimed in claim 3, wherein the clip is an R-clip configured to be drawn over the raised lip to locate the end of the wire relative to the wire clamp.

5. The wire clamp as claimed in claim 2, wherein interaction between the attachment portion and the connector at the end of the wire permits pivotal rotation of the wire about the attachment portion.

6. The wire clamp as claimed in claim 1, wherein the groove at one of the ends is laterally offset from the aperture at that end.

7. The wire clamp as claimed in claim 1, wherein the groove at the one of the ends is vertically aligned with the aperture at that end.

8. The wire clamp as claimed in claim 1, wherein the groove comprises an angled transition between the first end and second end.

9. The wire clamp as claimed in claim 1, wherein the securing device comprises an internally threaded passage intersecting with the aperture, and a fastener having an external thread configured to engage with the passage.

10. The wire clamp as claimed in claim 1, wherein a width of the aperture is less than twice the diameter of wire to be secured by the wire clamp.

11. The wire clamp as claimed in claim 1, wherein a height of the elongate opening is less than twice the diameter of wire to be secured by the wire clamp.

12. The wire clamp as claimed in claim 1, wherein one of the wires used with the wire clamp comprises a tensioning element.

13. The wire clamp as claimed in claim 12, wherein the tensioning element is a coil tension spring formed from the wire.

14. A method of connecting a first wire and a second wire to each other using a wire clamp, the wire clamp comprising: a body having a first end and a second end, an aperture in the body extending between the first end and the second end, an elongate opening extending along a side of the body between the first end and the second end and intersecting with the aperture along its length, a groove along a base of the body between the first end and the second end, and a securing device configured to extend into the aperture, the method comprising the steps of:
   positioning the first wire in the aperture such that a length of the first wire extends between the first end and the second end;
   passing the second wire through the elongate opening into the aperture such that a length of the second wire extends between the first end and the second end;
   extending the securing device into the aperture to bear against at least one of the wires such that the first wire and second wire are clamped together between the securing device and an inner surface of the aperture; and
   bending one of the first wire and the second wire about one of the first end and the second end of the body into the groove along the base of the body, and securing the one of the first wire and the second wire to itself at the opposite one of the second end and the first end of the body.

* * * * *